United States Patent
O'Hara, Jr. et al.

(10) Patent No.: US 7,302,256 B1
(45) Date of Patent: Nov. 27, 2007

(54) VIRAL WIRELESS DISCOVERY AND CONFIGURATION MECHANISM FOR WIRELESS NETWORKS

(75) Inventors: Robert B. O'Hara, Jr., Santa Clara, CA (US); Patrice R. Calhoun, Pleasanton, CA (US); Rohit Kumar Suri, Santa Clara, CA (US)

(73) Assignee: Airespace, Inc., San Jose, CA (US)

( * ) Notice: Subject to any disclaimer, the term of this patent is extended or adjusted under 35 U.S.C. 154(b) by 617 days.

(21) Appl. No.: 10/726,437

(22) Filed: Dec. 3, 2003

Related U.S. Application Data

(63) Continuation-in-part of application No. 10/447,735, filed on May 29, 2003.

(51) Int. Cl.
*H04M 3/00* (2006.01)

(52) U.S. Cl. ............... 455/418; 455/560; 455/434; 370/338; 370/349; 370/329; 370/402; 709/220

(58) Field of Classification Search ............ 455/418, 455/560; 370/338, 349, 329, 85.13; 709/220
See application file for complete search history.

(56) References Cited

U.S. PATENT DOCUMENTS

| | | | |
|---|---|---|---|
| 5,491,692 A * | 2/1996 | Gunner et al. ............ | 370/402 |
| 5,684,860 A | 11/1997 | Milani et al. | |
| 6,208,629 B1 * | 3/2001 | Jaszewski et al. ......... | 370/329 |
| 6,286,038 B1 * | 9/2001 | Reichmeyer et al. ...... | 709/220 |
| 6,760,318 B1 | 7/2004 | Bims | |
| 6,788,658 B1 | 9/2004 | Bims | |
| 6,917,819 B2 * | 7/2005 | Collins ................... | 455/560 |
| 6,925,070 B2 | 8/2005 | Proctor, Jr. | |
| 2002/0188723 A1 | 12/2002 | Choi et al. | |
| 2002/0194384 A1 | 12/2002 | Habetha | |
| 2003/0023746 A1 | 1/2003 | Loguinov | |
| 2003/0188006 A1 | 10/2003 | Bard | |
| 2003/0198208 A1 | 10/2003 | Koos, Jr. et al. | |
| 2003/0224787 A1 * | 12/2003 | Gandolfo .................. | 455/434 |
| 2004/0111607 A1 | 6/2004 | Yellepeddy | |

OTHER PUBLICATIONS

International Standard, ISO/IEC 8802-11 ANSI/IEEE Std. 802.11, 1999 Edition, Part II: Wirelss LAN Medium Access Control (MAC) and Physical Layer (PHY) specifications, pp. 122-137.
"Tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

*Primary Examiner*—Lester G. Kincaid
*Assistant Examiner*—Charles Shedrick
(74) *Attorney, Agent, or Firm*—Mark J. Spolyar

(57) ABSTRACT

Methods, apparatuses and systems directed to wireless discovery mechanism that facilitates the deployment and configuration of managed access elements in a wireless network system. In one embodiment, the present invention can be utilized to achieve a viral wireless discovery and configuration mechanism wherein un-configured access elements discovery network devices with which to exchange configuration information through wireless messages transmitted by configured access elements. Once configured, the newly installed access elements may then provide wireless messages to other un-configured access elements which receive configuration information in the same manner. In other embodiments, the wireless discovery mechanism can be used alternatively, as a supplement to, or as part of an enhancement to Layer 2 and 3 discovery mechanisms.

19 Claims, 8 Drawing Sheets

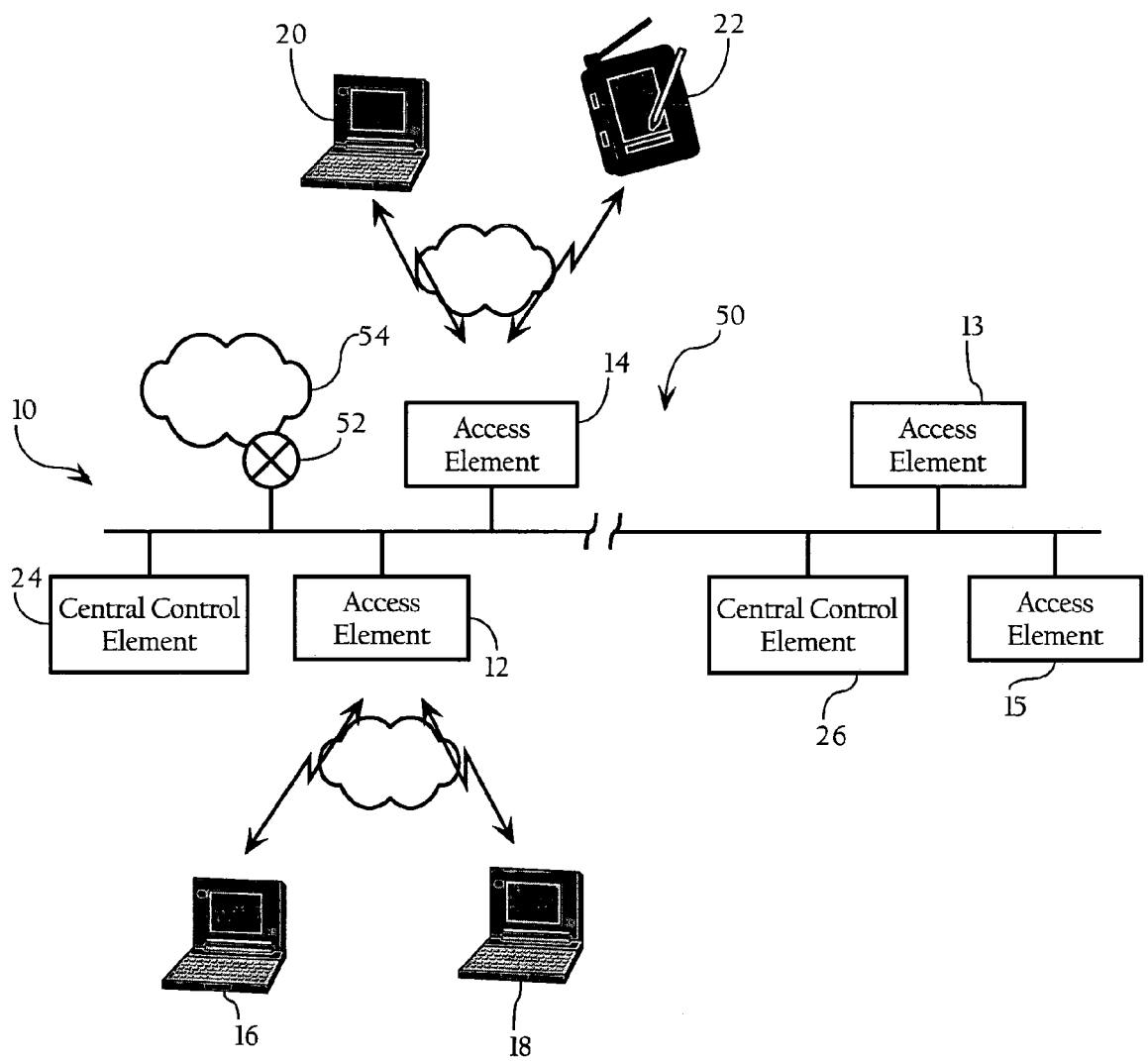
Fig._1

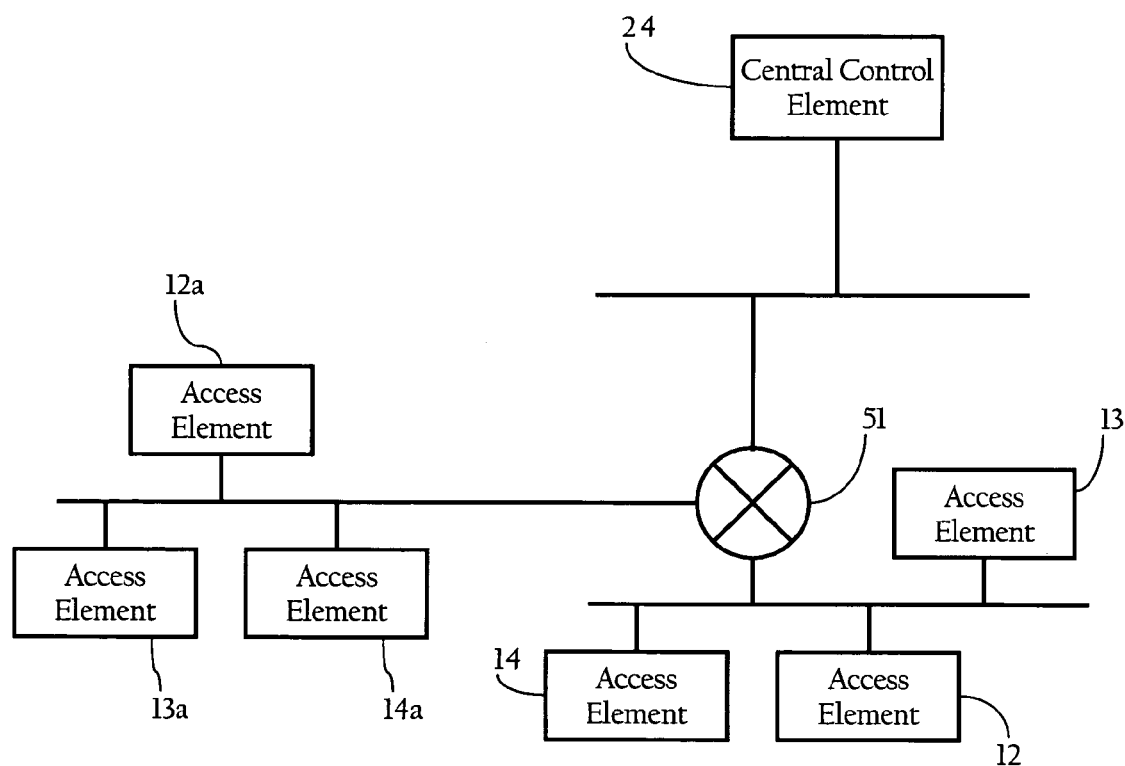
Fig._2

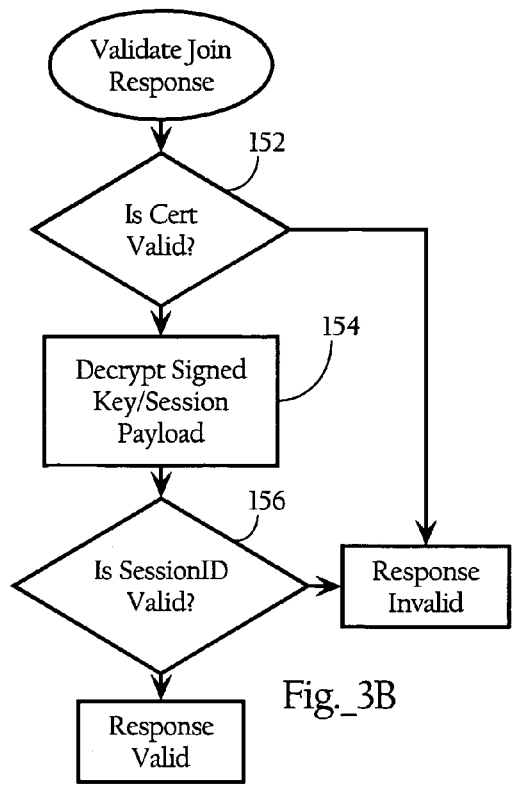
Fig._3B
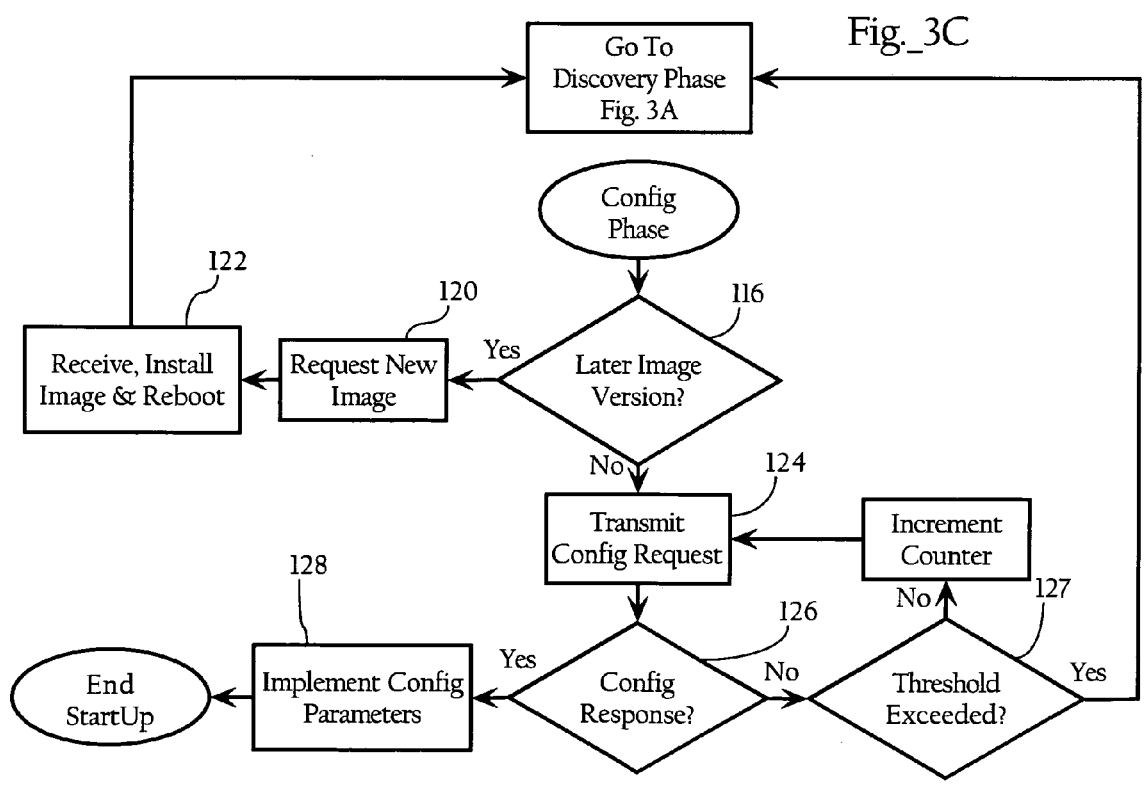
Fig._3C

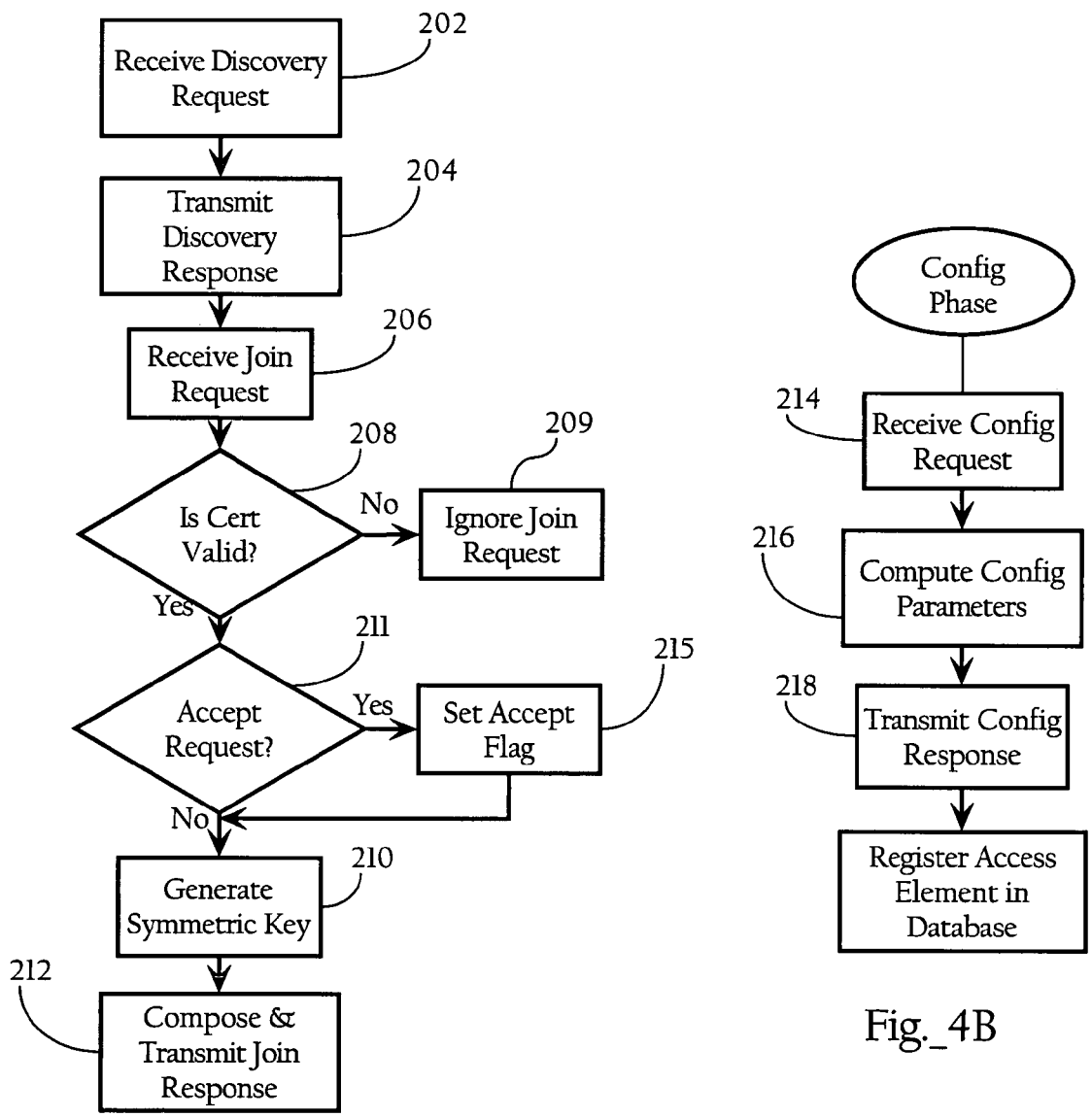
Fig._4A
Fig._4B

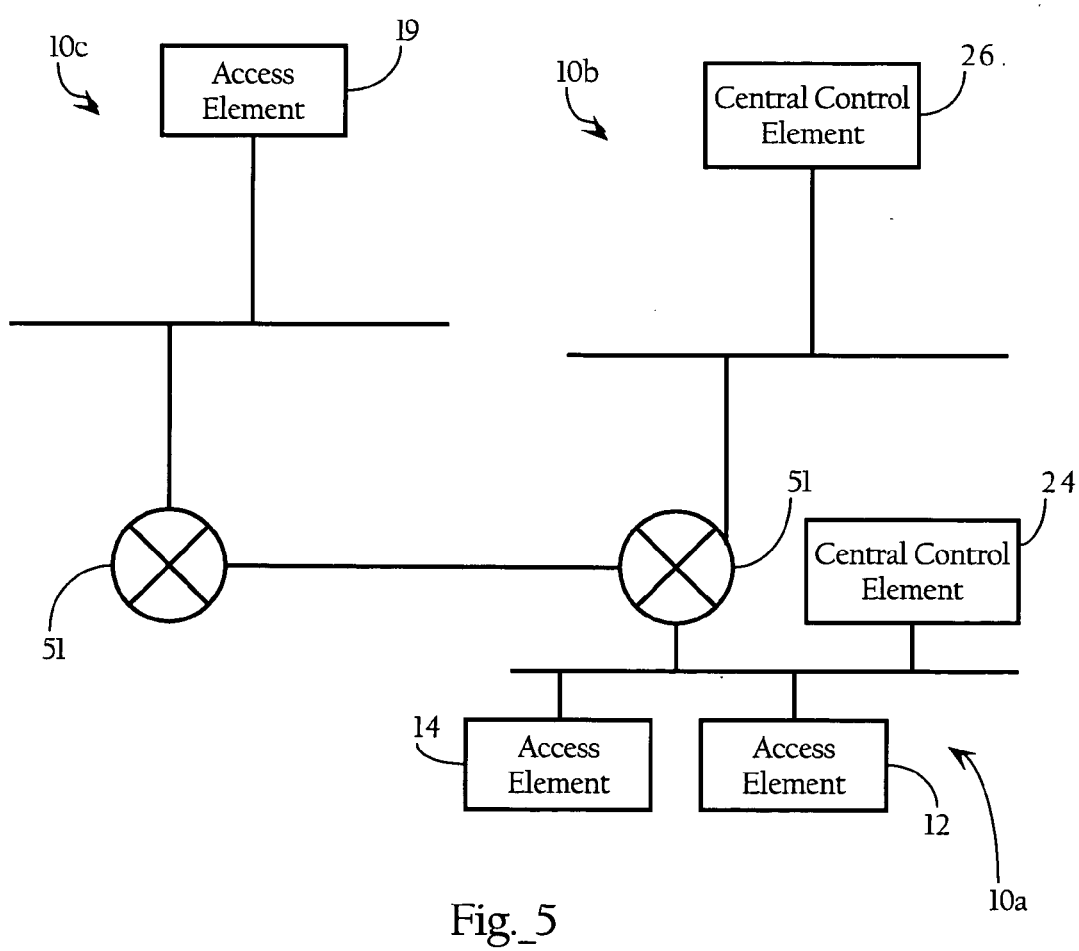
Fig._5

VIRAL WIRELESS DISCOVERY AND CONFIGURATION MECHANISM FOR WIRELESS NETWORKS

CROSS-REFERENCE TO RELATED APPLICATIONS

The present application is a continuation-in-part of U.S. application Ser. No. 10/447,735 in the name of Robert B. O'Hara, Jr., Robert J. Friday, Patrice R. Calhoun, and Paul F. Dietrich filed May 29, 2003 and entitled "Wireless Network Infrastructure including Wireless Discovery and Communication Mechanism."

This application also makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/394,905 in the name of Patrice R. Calhoun, Scott G. Kelly and Rohit Kumar Suri, entitled "Light-weight Access Point Protocol;" and U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to methods, apparatuses and systems implementing a viral, wireless discovery mechanism that facilitates the configuration of hierarchical wireless network systems.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments become critical to performance and security. Heretofore, it has not been recognized how important visibility into all layers of the network protocol is to optimization of network manageability and user performance in wireless LANs (WLANs). Unlike centrally-managed cellular wireless systems, known WLAN solutions use distributed access points to act as bridges between the wired infrastructure and the wireless clients, removing all physical and wireless media access protocol information from the protocol frames that are passed onto the infrastructure network. This results in uncoordinated handoffs of wireless clients moving between access points. An uncoordinated system of access points makes it difficult to manage a large number of access points, because there is no point of coordination. For example, known prior art wireless network systems such as conventional 802.11 systems provide the initial handshaking, access authentication and access association at a remote node without attention to overall network loading and signal quality.

This type of distributed architecture creates many problems affecting network management, mobility, and performance. Since each wireless LAN access point is a separate managed device, distributed architecture in general introduces many new managed elements in the network without sufficient attention to their global effects. Since the access points act in their own self-interest and are not aware of the actions taken by surrounding access points, they handle mobility (e.g., handoff actions) as a local event, which significantly increases latency.

U.S. application Ser. Nos. 10/155,938 and 10/407,357, identified above, disclose a hierarchical wireless network architecture that optimizes network management and performance of a relatively autonomously-managed WLAN. According to the system architecture, a central control element manages and controls one more access elements. These light-weight access elements perform real-time communication functions, such as data transfer and acknowledgements, while the central control element manages the connection between the access element and one or more wireless client devices.

Configuration of wireless network systems incorporating many managed access points can be complicated and time consuming. For example, configuration of the access elements in the hierarchical wireless network architecture disclosed above can be complicated and/or time consuming, especially where large numbers of access elements are deployed. Accordingly, it is desirable for access elements to include automatic configuration functionality that allows a network administrator to simply install an access element on a LAN and power it up. The access element may then automatically discover a central control element and receive configuration information. For example, U.S. application Ser. No. 10/394,905 discloses a light-weight access point protocol directed to the initialization, configuration and failover support tasks associated with access elements in a wireless network system.

FIG. 1 illustrates a hierarchical wireless network system where central control elements 24, 26 and access elements 12-15 communicate over respective LAN segments. As discussed in the above-identified U.S. patent applications, the communications interface between the central control element and an access element is typically a Layer 2 interface. Accordingly, when a new access element 12, for example, is deployed on a given LAN segment 10, it can be configured to automatically discover a central control element 24 by broadcasting discovery requests in an attempt to locate a central control element that responds to the discovery request. With knowledge of a responding central control element 24, for example, access element 12 can receive certain configuration information, such as a channel assignment, etc., and begin operation.

FIG. 2 illustrates a network environment where the central control element 24 is located on a different Layer 2 or Link Layer network than access elements 12-14, as well as access elements 12a-14a located on another LAN. As FIG. 2 illustrates, a router 51 is disposed between the LAN segment to which access elements 12-14 are connected and the LAN segment to which central control element 24 is connected. Similarly, router 51 also separates the LAN segment to which access elements 12a-14a are connected from the LAN segment associated with central control element 24. This deployment presents certain challenges both as to the initial, automatic configuration of access elements and re-configurations required by the failure of central control element 24. For example, to provide for failover support, access elements are typically configured to discover other available central control elements upon the failure of the central control element that was controlling the access element. In such an environment, however, Layer 2 discovery methodologies, such as broadcasting discovery requests, cannot be employed to discover central control elements on other Layer 2 networks that are separated by routers.

Possible solutions to this configuration obstacle include configuring the access elements to multicast discovery requests; however, not all networks support multicast, rendering this option inapplicable on a large number of network infrastructures. A second option is to require a network administrator to statically configure the newly-installed access element with the IP address of the central control element 24. This option can be problematic in large network deployments and, furthermore, does not address the requisite failover support. A third option is to extend the Dynamic Host Control Protocol (DHCP) functionality of the network to support vendor-specific extensions. Under such an option, when an access element requests and acquires an IP address from a DHCP server, the responding DHCP server may include the IP or other network address of central control element 24 in an extension to a DHCPOFFER packet. This option, however, requires the network administrator to change the DHCP configuration of the managed network, which is potentially more complicated and time consuming than other options. In any event, network administrators are often reluctant to change the configuration of a network once it is working properly. Lastly, a fourth option is to implement a VLAN to create a virtual LAN that allows for broadcasts of Layer 2 discovery requests to traverse router 51. Routers are typically installed to contain broadcast messages in smaller segments of the overall network to increase network efficiency. Configuration of a VLAN, thus, begins to undermine the very purpose for which routers are sometimes installed. In addition, the configuration of a VLAN, if not already implemented, requires changes to the underlying network infrastructure, which network administrators are hesitant to allow.

Accordingly, a need in the art exists for methods, apparatuses and systems that facilitate the deployment and configuration of managed access elements in a hierarchical wireless network system. A need in the art exists for methods, apparatuses and systems that facilitate deployment and configuration of access elements in a hierarchical wireless network system in a manner that seamlessly integrates with existing network infrastructures. Embodiments of the present invention substantially fulfill this need.

SUMMARY OF THE INVENTION

The present invention provides methods, apparatuses, and systems directed to a wireless discovery mechanism that facilitates the deployment and configuration of managed access elements in a wireless network system. In one embodiment, the present invention can be utilized to achieve a viral wireless discovery and configuration mechanism wherein un-configured access elements discover network devices with which to exchange configuration information through wireless messages transmitted by configured access elements. Once configured, the newly installed access elements may then provide wireless messages to other un-configured access elements which receive configuration information in the same manner. In other embodiments, the wireless discovery mechanism can be used alternatively, as a supplement to, or as part of an enhancement to Layer 2 and 3 discovery mechanisms.

DESCRIPTION OF THE DRAWINGS

FIG. 1 is a functional block diagram illustrating a wireless network system according to an embodiment of the present invention.

FIG. 2 is a functional block diagram illustrating deployment of a wireless network system architecture, according to a second embodiment of the present invention, across two Layer 2 networks.

FIG. 3B is a flow chart diagram setting forth a method directed to the validation of a join response transmitted by a central control element.

FIG. 3C is a flow chart diagram showing a method directed to the configuration phase of an access point protocol according to an embodiment of the present invention.

FIG. 4A is a flow chart diagram illustrating a method supporting the initialization and configuration of access elements.

FIG. 4B is a flow chart diagram setting forth a method directed to supporting the configuration of access elements.

FIG. 5 is a functional block diagram illustrating a hierarchical wireless network system deployed across a network.

DESCRIPTION OF PREFERRED EMBODIMENT(S)

Figure 3A:
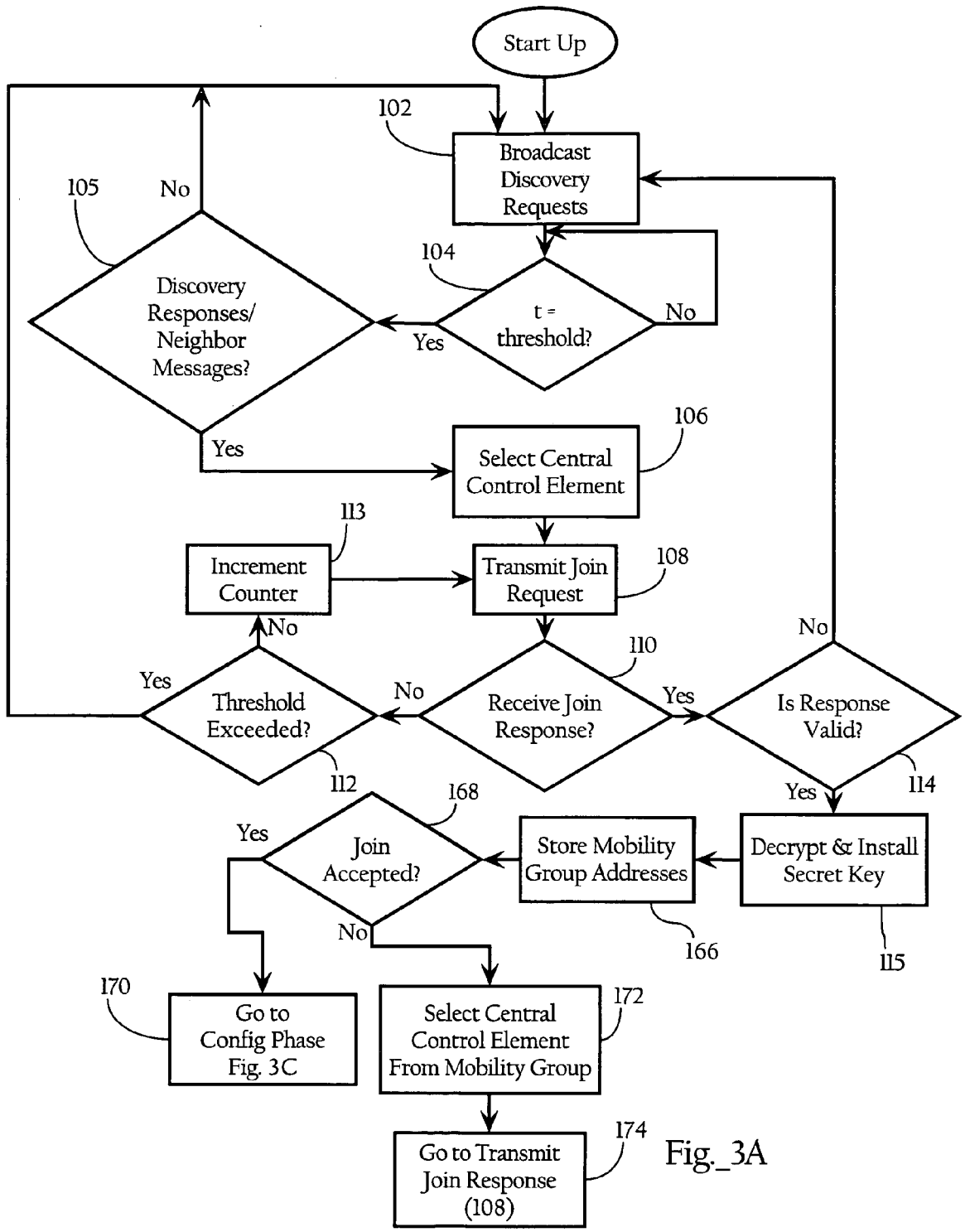
FIG. 3A is a flow chart diagram providing a method directed to the initialization and configuration of an access element.

A. Operating Environment and Exemplary System Architectures

For didactic purposes, an embodiment of the present invention is described as operating in a WLAN environment as disclosed in U.S. application Ser. No. 10/155,938 incorporated by reference herein. As discussed below, however, the present invention can be implemented in a variety of WLAN system architectures.

FIG. 1 illustrates a wireless computer network environment according to an embodiment of the present invention. Referring to FIG. 1, there is shown a block diagram of a wireless Local Area Network (LAN) 10 according to an embodiment of the invention. A specific embodiment of the invention includes the following elements: access elements 12-15 for wireless communication with remote client elements 16, 18, 20, 22 and central control elements 24, 26 for controlling and managing the wireless connections between the access elements 12-15 and the remote client elements. In one embodiment, access elements 12, 14 are directly connected to LAN 10 or a virtual local area network (VLAN) for communication with central control element 24, while access elements 13, 15 are connected to a second LAN segment for communication with central control element 26. In one embodiment, central control elements 24, 26 and access elements 12-15 are all connected to the same VLAN to allow for layer 2 and layer 3 discovery mechanisms as described more fully below.

The access elements 12-15 are coupled via communication means using a wireless local area network (WLAN) protocol (e.g., IEEE 802.11a or 802.11b, etc.) to the client remote elements 16, 18, 20, 22. The LAN segment 10 connecting the access elements 12, 14 and the central control element 24 is typically an Ethernet network, but it could be anything else which is appropriate to the environment. In one embodiment, the access elements 12, 14 and the central control element 24 tunnel network traffic associated with corresponding remote client elements 16, 18; 20, 22 over the computer network. Central control element 24 is also operative to bridge the network traffic between the remote client elements 16, 18; 20, 22 transmitted through the tunnel with corresponding access elements 12, 14. Accordingly, remote client elements 16, 18; 20, 22 may, for example, access resources available on WAN 50 or on global network 54 via router 52.

As described in the above-identified patent applications, central control element 24 operates to perform link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control element 24 may also transmit control messages to the access elements 12, 14 to change various operational parameters, such as frequency channel and transmit power. Central control element 26 and associated access elements 13, 15 operate in a similar or identical manner.

As FIG. 1 illustrates, according to another embodiment, central control element 24 can communicate with access elements 12, 14 over local area network segment 10. In addition, using a virtual local area network (VLAN) technology and protocols, central control element 24 may also communicate with access element 15 over WAN 50. Suitable VLAN protocols include the IEEE 802.1Q (VLAN tagging) protocol or any other protocol allowing for a logical or virtual link layer connection between the central control element and the access elements. According to this deployment architecture, wireless traffic associated with remote client elements 16, 18; 20, 22, according to one embodiment, can be tunneled between the central control element 24 and the access elements 12, 14. In another embodiment, access elements 12, 14 can operate to directly bridge network traffic between remote client elements 16, 18; 20, 22 and WAN 50, while tunneling network management messages, such as authentication and association requests from remote client elements to central control element 24 as discussed above. In addition, according to either embodiment, access elements 12, 14, central control element 24, or both access elements 12, 14 and central control element 24 can include layer 2 discovery mechanisms allowing for automatic discovery and configuration across WAN 50 of the components (central control elements and access elements) effecting the wireless network environment.

FIG. 5 illustrates a subset of the components of a hierarchical wireless network system deployed across a wired network environment. Specifically, routers 51 operably connect LANs 10a, 10b, and 10c. As FIG. 5 illustrates, central control element 24 and access elements 12, 14, are connected to LAN 10a. LAN 10b includes central control element 26, while LAN 10c includes newly installed, but un-configured access element 19. In one embodiment, central control elements 24, 26 are each configured with the IP or other network layer address of at least one other central control element. For example, central control element 24 may be configured with the IP address of central control element 26 and/or other central control elements. In one embodiment, each central control element 24, 26 maintains a mobility group data structure that stores the IP addresses of the central control elements that define a mobility group. In one implementation, a mobility group is an administratively or automatically defined grouping of central control elements some of whose access elements share radio connectivity to facilitate various wireless management tasks such as load sharing and hand-offs between access elements. With knowledge of the IP address of central control element 26, central control element 24 may better handle hand-offs of wireless clients from an access element controlled by it to an access element controlled by central control element 26. In one embodiment, once the mobility group is defined, the central control elements are operative to monitor the status (e.g., up or down) of the other central control elements in that mobility group. In one embodiment, this is accomplished by periodically transmitting "keep-alive" packets or other messages to the other central control elements in the mobility groups. If a central control element does not respond to the "keep-alive" packet after a threshold period of time, the transmitting central control element assumes that it is down. To add a central control element to a given mobility group, a network administrator accesses a configuration interface for a central control element within that group and specifies the IP address of the new central control element. The updated mobility group data is then shared across the other central control elements in that group.

A.1. Neighbor Message Functionality

The access elements 12-15, in one embodiment, include the neighbor message functionality disclosed in U.S. application Ser. No. 10/447,735. As discussed in that application, the access elements 12-15 each transmit neighbor messages (e.g., packets or frames) containing network configuration and/or management information to neighboring access elements to facilitate management and configuration tasks associated with the wireless network environment. The access elements, in one embodiment, transmit the neighbor messages over all available frequency channels in a sequential manner. Accordingly, any access element, operating on a given channel and within range will eventually receive the neighbor message. Access elements, configured to operate in connection with central control elements, that receive the neighbor messages, in one embodiment, tunnel the messages to their corresponding central control elements for processing. As discussed more fully below, un-configured access elements can use neighbor messages received from other access elements to discover central control elements and, ultimately, receive configuration information.

In one embodiment, a neighbor message is a single wireless data link layer frame; however, in other embodiments, a neighbor message may span several wireless data link layer frames. FIG. 8 is a diagram illustrating the frame layout, according to an embodiment of the present invention, for a wireless neighbor message transmitted between access elements. In wireless network environments employing 802.11 protocols, the neighbor message 60 is an 802.11 frame comprising an 802.11 wireless distribution system mode header, a snap Logical Link Control (LLC) header 64, and a payload 70. For descriptive purposes, the frame layout diagram of FIG. 8 omits certain header fields, such as the Sequence and FCS fields that are not relevant to certain embodiments of the invention. In addition, those skilled in the art will recognize that other wireless link layer protocols may necessitate different frame layouts. As discussed above, the neighbor message 60, in one embodiment, is an 802.11 data frame including a wireless distribution system mode header 62 (i.e., where the "From DS" and "To DS" bits are both set to "1" in the frame control byte). In one embodiment, the receive address (RA) and the destination address (RA) are set to a multicast type address (e.g., the multicast bit is set) where the first three octets are the Organizationally Unique Identifier (OUI) associated with the manufacturer of the access element, followed by all zeros (or any arbitrary value) in the remaining three octets. For example, the receive and destination addresses may be set to 01:0b:85:00:00:00, where 00:0b:85 is the OUI associated with the manufacturer of the access element. The transmitter address (TA) and the source address (SA) fields, in one embodiment, are set to the Basic Service Set Identifier (BSSID) of the transmitting access element. Other addressing schemes are possible depending on the configuration of the access elements, such as access elements presenting more than one WLAN MAC address. The Logical Link Control snap header 64, in one embodiment, includes a payload type identifier field which, for neighbor messages, is set to a value identifying a neighbor message. In one embodiment, the payload type identifier is a 1-byte value. The payload type identifier allows receiving access elements configured to recognize neighbor messages to identify them for processing as neighbor messages, as opposed to regular 802.11 data or management frames. Other access elements or central control elements not configured to recognize the neighbor messages can simply discard or ignore them.

The payload 70 of the neighbor message 60 can include a variety of data fields depending on desired objectives. The neighbor message payload 70, in one embodiment, includes 1) the LAN MAC address of the central control element, such as central control element 24, to which the transmitting access element is associated, and 2) the IP address of the central control element. In certain embodiments, the neighbor message payload may include other fields, such as 3) a 1-byte channel field (indicating the current transmit channel), 4) a 1-byte power field (indicating current transmit power), and 5) a 1-byte antenna field (indicating antenna type). The neighbor message payload may further include security data, such as a digital signature or authentication key, which allows for verification that the neighbor message came from an authorized access element. Digital signatures and authentication technologies are known in the art. Accordingly, one skilled in the art will be able to implement various authentication schemes allowing for verification of neighbor messages. The neighbor message payload 70 may contain yet other fields, such as a group identifier indicating the group of access elements to which the transmitting access element has been assigned for administrative purposes (e.g., configuration and other tasks such as hand-offs of wireless clients between access elements). For example, administrative groups may comprise one or more central control elements and associated access elements, where one of the central control elements (a "group leader") performs various configuration tasks for the group, such as coordination of channel assignments, transmit power levels, and the like. In one embodiment, the neighbor message payload may further include the MAC and IP addresses of the group leader.

Figure 6:
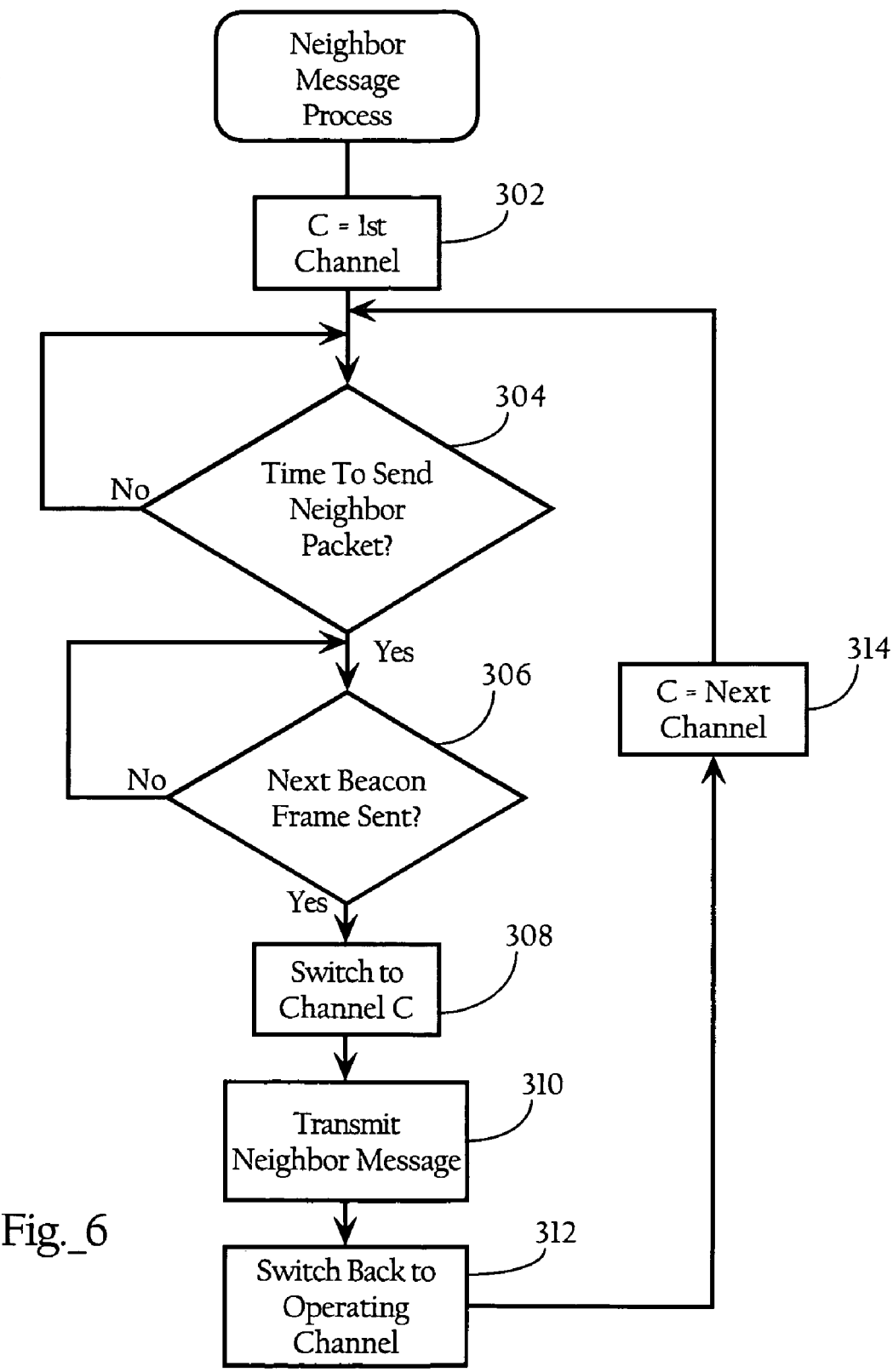
FIG. 6 is a flow chart diagram providing a method directed to transmitting wireless neighbor messages.
Figure 7:
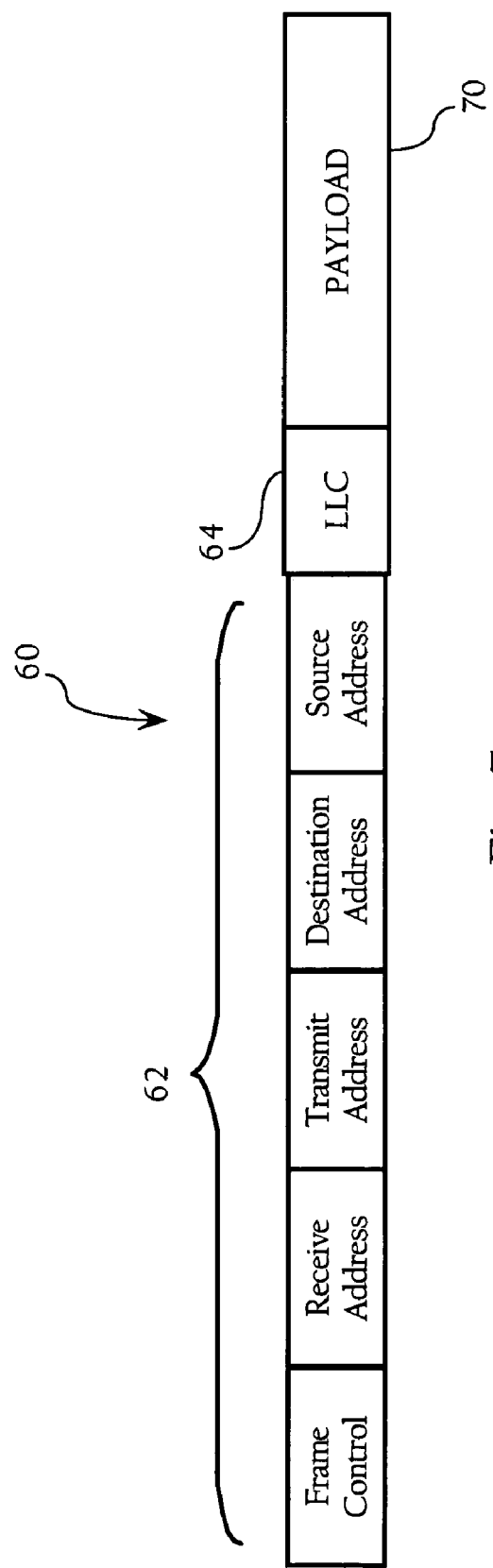
FIG. 7 is a diagram illustrating the frame layout of a neighbor message according to an embodiment of the present invention.

In one embodiment, the access elements transmit neighbor messages in synchronization with beacon frames transmitted according to the 802.11 protocols. In 802.11 network environments, some wireless stations are quite sensitive to interruptions in receiving beacon packets, which typically are transmitted 10 times every second. Accordingly, the access elements, in one embodiment, are configured such that transmission of neighbor messages does not interrupt certain data link layer management functionality. FIG. 6 illustrates a method, according to an embodiment of the present invention, directed to the transmission of neighbor messages. Upon initialization of the access element or the neighbor message process, the transmission channel, C, is set to the first channel (302). As block 304 illustrates, the process, in one embodiment, transmits neighbor messages at periodic intervals. In one embodiment, the process is configured such that a neighbor message is transmitted on every available operating channel (or a configurable subset of operating channels) within a 1-minute (or other configurable) period. In the embodiment shown, the process waits until it is time to send a neighbor message (304). At this interval, a daemon, in one embodiment, is invoked to monitor the data link layer processes of the access element and to detect the transmission of a beacon frame (306). When transmission of a beacon frame occurs, the daemon switches the transmission channel to channel C (308), causes the access element to transmit the neighbor message (310), and switches the transmission channel to the original operating channel (312). During the transmission of neighbor messages, the access elements can either just disappear (from the perspective of the remote client elements) for the transmission period, or use the mechanisms in 802.11 for "contention-free periods" to halt the transmissions of the mobile stations before going off channel to transmit the neighbor message. As FIG. 6 shows, the channel parameter is incremented (314) and the process waits until it is time to send another neighbor message.

B. Wireless Discovery and Configuration

As discussed herein, a newly deployed, yet un-configured access element can use neighbor messages to discovery one or more central control elements with which to associate and receive a configuration allowing it to operate in connection with a given central control element. For didactic purposes, the wireless discovery functionality according to the invention is described as operating in connection with the lightweight access point protocol disclosed in U.S. application Ser. No. 10/395,904, incorporated by reference above. However, the present invention can be incorporated into a variety of protocols and technologies associated with the configuration and management of access elements in a hierarchical wireless network system. In addition, as the following description of discovery and configuration functionality indicates, a newly deployed access element may monitor for neighbor messages transmitted by other access elements, and broadcast discovery requests over a computer network, to discover central control elements. In other embodiments, however, the use of neighbor messages may be the exclusive means of discovering central control elements.

The light-weight access point protocol includes functionality directed to initialization and configuration of access elements, as well as failover support. At start-up, the light-weight access point protocol, according to an embodiment of the present invention, includes three main phases: discovery, joinder, and configuration. During the discovery phase, the access element discovers the central control elements to which it can associate. During the joinder phase, the access element and a selected central control element authenticate one another and establish cryptographic keys for use in encrypting subsequent communications. Lastly, the configuration phase involves the configuration of the access element with, for example, operational parameters and, potentially, new software images. The access elements and the central control elements can communicate using a variety of protocols, such as IEEE 802.3, IEEE 802.2, IP, UDP, TCP, etc.

In one embodiment, beyond the functionality discussed above, the central control elements include an image of the access element software accessible to the access elements as discussed more fully below. In addition, the access elements each include a configuration module operative to perform the initialization and configuration functionality described herein. The central control elements and the access elements further include symmetric and asymmetric encryption functionality to perform tasks such as validating digital signatures, and encrypting messages. In addition, the central control elements, in one embodiment, include a cryptographic key generator for generating cryptographic keys.

In one embodiment, authentications between central control elements and access elements are provided by x.509 digital certificates and RSA digital signatures. Privacy is provided to the key exchange via RSA encryption. The symmetric cryptographic keys, discussed herein, are generated (in one embodiment) using a random number generator which comprises both hardware and software components. Symmetric encryption is provided by using the AES encryption algorithm in counter mode (AES-CTR). Integrity protection (also known as data authentication) is provided using AES-CBC-MAC. A composition of these two algorithms is known as AES CCM (Counter with CBC MAC). However, a variety of well-known encryption algorithms can be used. For example, DSA signatures can be used as an alternative to RSA digital signatures. El-Gamal encryption can be used as an alternative to RSA encryption. Alternatives to AES-CCM encryption include the combination of AES-CBC and HMAC-SHA1, as well as CCM encryption include the combination of AES-CBC and HMAC-SHA1, as well as 3DES-CBC and HMAC-SHA1.

FIG. 5 illustrates, for didactic purposes, the installation of access element 19 to LAN 10c. FIGS. 3A, 3B and 3C set forth a method, according to an embodiment of the present invention, implementing the discovery, joinder and configuration phases associated with an embodiment of the present invention. FIGS. 4A and 4B provide a method, implemented by central control elements, supporting the discovery and configuration functionality described herein.

At startup, access element 19 broadcasts or multicasts discovery requests throughout LAN 10c and monitors for discovery responses in an attempt to identify central control elements (102). The discovery request may be a single IP packet or native link layer frame, such as an Ethernet frame. As FIG. 3A illustrates, access element 19 waits a threshold period of time for the receipt of discovery responses (104, 105) before broadcasting additional discovery requests. During this threshold period of time, access element 19 also monitors for neighbor messages transmitted by neighboring access elements, such as access elements 12, 14. As discussed above, configured access elements 12, 14, in one embodiment, transmit neighbor messages at periodic intervals on all available frequency channels. Accordingly, unconfigured access element 19 need only monitor one frequency channel, as access element 12, 14 will eventually transmit a neighbor message on that channel. In another embodiment, the neighbor message functionality associated with access elements 12, 14 operates on a single, default frequency channel. In one such embodiment, access element 19 can be configured to monitor on the default frequency channel. As one skilled in the art will recognize, however, that different wireless network systems may require access element 19 to use different monitoring schemes. For example, the access elements 12, 14 may be configured to transmit neighbor messages on a single frequency channel. In such an embodiment, access element 19 must rotate through frequency channels to eventually receive a neighbor message from a neighboring access element, if any.

As discussed above, neighbor messages include the IP address of the central control element that controls the corresponding access element. In the didactic example of FIG. 5, the neighbor messages transmitted by access elements 12, 14 include the IP address of central control element 24. In one embodiment, the neighbor messages may include the IP address of a "group leader" central control element (e.g., central control element 26) in addition to, or in lieu of, the IP address of central control element 24. As FIG. 4A illustrates, access element 19 may also receive responses to discovery requests. In one embodiment, a central control element that receives the discovery request (202) transmits a discovery response to access element 19 (204). Each discovery response, in one embodiment, comprises a central control element identifier and a load parameter. In one embodiment, the discovery response further includes the IP address of the responding central control element. The central control element identifier, in one embodiment, is an arbitrary identifier assigned by a network administrator. The load parameter indicates the performance load associated with the central control element. For example, the load parameter, in one embodiment, is the number of access elements under the management and control of a given central control element. In one embodiment, the discovery response also indicates whether the responding central control element is the "group leader" or master central control element. A master central control element is a central control element exclusively tasked with the configuration of access elements. In a large network deployment, centralization of the configuration functionality at a master central control element eases management tasks associated with deploying the wireless network system. For didactic purposes, assume that a network administrator has configured central control element 26 as the master central control element. The master control element indication may be embedded in the central control element identifier or may be contained in a separate, reserved field or bit of the discovery response.

As FIG. 3A illustrates, access element 19 waits a threshold period of time (104, 105) for discovery responses from one or more central control elements (and neighbor messages) and selects one of the central control elements identified in the discovery responses or neighbor messages (106). Access element 19 may be configured to select a central control element according to a variety of criteria. For example, access element 19 may select the least-loaded central control element that responds to a discovery request before selecting a central control element discovered by receiving a neighbor message. In one embodiment, selection of responding central control elements follows the following priority: 1) the primary central control element (if configured), 2) the master central control element, and 3) the central control element reporting the smallest load. A primary central control element is a central control element that access element 19 is configured to select. Access element 19 may be configured with a primary central control element as a result of a previous iteration of the start up and configuration protocol described herein, or as a result of manual configuration by a network administrator. In one implementation, the central control element with which access element 19 ultimately joins becomes the primary central control element. Once configured, the access element 19 will select this primary central control element upon subsequent start-ups or reboots, if it is available. In another embodiment, access element 19 may select a central control element discovered through a neighbor message over central control elements responding to discovery requests. In another embodiment, access element 19 may select a central control element identified both in a neighbor message and a discovery response, if any, over central control elements discovered through only one of the two discovery methods. In this manner, the present invention allows access element 19 to discover a central control element on the same LAN, if any, or another LAN that also controls access elements that neighbor it (as defined by RF connectivity). In the didactic example provided by FIG. 5, access element 19 receives no discovery responses, as the discovery requests broadcast by access element 19 do not reach access central control elements 24, 26 as no VLAN has been implemented to create a virtual LAN across LANs 10a, 10b and 10c, and the network does not support multicast. In this didactic example, therefore, access element 19 receives neighbor messages from access element 12 and/or 14 and selects a central control element to which it will transmit a join request. In embodiments involving a master central control element, for example, access element 19 selects the master central control element if one is identified in the neighbor messages. In other embodiments, access element 19 selects the responding central control element that reports the smallest load (e.g., the smallest number of access elements under management).

After selection of a central control element, access element 19 transmits a join request to the selected central control element (here, central control element 24 for purposes of illustration). The join request, in one embodiment, includes an access element identifier, a digital certificate and a session identifier. In one embodiment, the join request includes other fields, such as the WLAN MAC address, software image version, etc. In one embodiment, access element 19 is configured with a default access element identifier, which a network administrator can change as appropriate (e.g., "SW Conference Room AP," etc.). In one embodiment, a network administrator, knowing the LAN MAC address of access element 19 can access a configuration interface to configure a name or other identifier for access element 19 and then invoke the initialization and configuration processes described herein. The digital certificate includes a name or other identifier, a serial number, the LAN and/or WLAN MAC address associated with access element 19, a copy of the public key of the access element (used for encrypting messages and digital signatures), and the digital signature of the certificate-issuing authority (in one embodiment, the manufacturer of the access element) so that central control elements can verify that the digital certificate is authentic. As FIG. 3A illustrates, access element 19 waits for a predetermined period of time for a join response (110). If no join response is received within this period of time, access element 19 retransmits the join request (112, 113). After a threshold number of failed attempts, access element 19, in one embodiment, restarts the discovery process to locate other central control elements. In another embodiment, access element 19 attempts to join with another central control element identified during the previous discovery process.

Central control element 24 (in this example) receives the join request (206) and authenticates the digital certificate in the join request (208). In one embodiment, central control element 24, using the public key of the certificate-issuing authority, validates the digital certificate. If the digital certificate is invalid, central control element 24 ignores the join request (209). Optionally, central control element 24 can issue a notification to a network administrator. Otherwise, central control element 24 then determines whether to accept the join request (211). The determination as to whether to accept the join request can be made in relation to a variety of considerations, such as the current load or network traffic transmitted through central control element, the number of access elements it currently supervises, etc. If the central control element 24 decides to accept the join request, it sets an "accept" flag in the join response (215). Of course, an acceptance in the join response may be indicated in a variety of manners. In any event, central control element 24, in one embodiment, generates a secret, shared cryptographic keys (in one embodiment, an authentication key and an encryption key) that will be used to encrypt and authenticate messages between it and access element 19 (210). Central control element 24 then composes a join response and transmits it to access element 19 (212).

The join response, in one embodiment, includes the IP address(es) of the central control elements in the mobility group to which central control element 24 belongs. In the didactic example of FIG. 5, the mobility group may comprise central control elements 24, 26. The join response, in one embodiment, further includes the cryptographic keys (see below), the digital certificate of the central control element, and, optionally, the software image version supported and implemented by central control element 24. Similar to the access element, the digital certificate associated with the central control element includes a name or other identifier, a serial number, a MAC address, a copy of the public key of the central control element, and the digital signature of the certificate-issuing authority (in one embodiment, the manufacturer of the access element) so that access elements can verify that the digital certificate is authentic. To securely transmit and allow for verification of the symmetric cryptographic keys, central control element 24 encrypts the cryptographic keys with the public key of access element 19 using an asymmetric encryption algorithm, adds the session identifier to the enciphered cryptographic keys, and digitally signs the resulting string with its private key. In one embodiment, the IP addresses associated with the mobility group can be included in the cipher.

When access element 19 receives the join response, it validates the join response (114) and, assuming the join response is valid, decrypts and installs the symmetric cryptographic keys (115). FIG. 3B shows a method, according to one embodiment of the present invention, for validating a join response. Access element 15 validates the digital certificate associated with central control element 24 (152). If the digital certificate is valid, access element 15 then verifies the signature of the signed key/sessionID payload using the public key of the central control element 24 (154) and validates the session identifier (156). Access element 15 then decrypts the cipher including the cryptographic keys (and, in one embodiment, the mobility group IP addresses) using its private key (115). Transmission of data (e.g., configuration data, control messages, management messages, etc.) between the access element 19 and central control element 24 can now be encrypted and authenticated using the shared secret cryptographic keys. In one embodiment, the central control elements can generate new cryptographic keys and provide them to the access elements at periodic intervals (e.g., every hour).

As FIG. 3A illustrates, access element 19 then stores the mobility group IP addresses in a data structure for possible later use (166). If the accept flag in the join response is set (168), access element proceeds to the configuration phase (170) (see also FIG. 3C). Otherwise, access element 19 selects another central control element from the mobility group (172) and uses the IP address of the selected central control element to transmit a join response (174). In this manner, access element 19 learns of other central control elements (e.g., 24, 26) outside of LAN 10c, which it may not have been able to discover during the discovery phase, above. In addition, access element 19 can access these central control elements in the event that the join request is denied. In addition, in the event that central control element 24 fails, access element 19 can choose another central control elements in the administrative group to transmit a join request and ultimately operate in connection of another central control element.

As FIG. 3C illustrates, access element 19 begins the configuration phase, in one embodiment, by comparing the image version identifier in the join response to the image version installed on access element 19 (116). If the image version in the join response is later than the image version associated with access element 19, access element requests the new image version from central control element 19 (120). Access element 19 receives the new image version, installs it and reboots (122), thereby restarting the initialization process described herein. In one embodiment, the image request and response are encrypted using the shared symmetric key exchanged during the joinder phase.

Access element 19, assuming it has a current image version (at least relative to central control element 24), composes and transmits a configuration request to central control element 24 (124). As FIG. 3C provides, access element 19, in one embodiment, retries the configuration request a threshold number of times, after which it returns to the discovery phase (126, 127). The configuration request, in one embodiment, includes a set of overriding configuration parameters that cannot be changed. As discussed above, in one embodiment, the access elements include a configuration interface (e.g., a command line interface, browser interface, etc.) that allows a network administrator to directly configure an access element. In one embodiment, the configuration interface allows a network administrator to configure one or more operational parameters (such as channel, transmit power, internal v. external antenna, etc.) and flag certain operational parameters as overriding parameters which a central control element can not change, except with a new "overriding" parameter value. In another embodiment, access element 19 can be configured only through an interface presented by a central control element.

As FIG. 4B illustrates, central control element 24 receives the configuration request (214), and generates the operational parameters for access element 15 (216), taking into account the overriding parameters identified in the configuration request. Central control element 24 then transmits a configuration response including the operational parameters (218), and registers the access element 19 in a database (e.g., a single table, or a relational database), including identifying information (e.g., LAN MAC address, WLAN MAC address, access element identifier, etc.) and the operational parameters associated with the access element (220). Access element 19 receives the configuration response (126), optionally stores the operational parameters in non-volatile memory, implements the operational parameters (128), and switches to an access point mode. In one embodiment, access element 19 switches to access point mode, using the configuration information provided by the central control element 24, and transmits a message indicating the start up event to the central control element 24.

During subsequent start-ups (such as after power cycling, or a forced reboot), access element 19, now configured with the central control element identifier (or link and/or network layer addresses) corresponding to its primary central control element (as well as the other central control elements in the mobility group), associates with that central control element as the primary central control element, and among other functions transmits neighbor messages as well. After the initial configuration, a network administrator may then access a configuration interface associated with central control element 24 and further configure access element 19. For example, the network administrator may specify overriding parameters, or assign a new access element identifier. In addition, the network administrator may configure the access element to associate with an alternative, primary central control element, such as central control element 26.

The access elements, in one embodiment, during normal access point mode operation transmit "keep-alive" messages to their respective primary central control elements to detect failure events associated with the central control elements. Specifically, an access element that does not receive a response to a keep-alive message after a threshold period of time and/or after a threshold number of attempts, assumes that its primary central control element has failed. During a failover mode, the affected access elements can select another central control element from the mobility group and repeat the joinder and configuration phases discussed above. During this failover period, the access element periodically broadcasts or multicasts discovery requests to its primary central control element and re-associates with it when it receives a discovery response. In one embodiment, assuming a new central control element has been installed, the network administrator configures the central control element identifier to match that of the failed central control element, thereby allowing the access element to identify the new central control element as its primary controller.

The IP addresses of the mobility group can be transmitted to the access elements at other stages of the configuration and/or normal operation. For example, the mobility group data can be transmitted in a discovery response, or even during the configuration phase. In addition, the central control elements may update the access elements under their respective control with the mobility group addresses associated with operational or active central control elements in that group. For example, if a central control element goes down, the other central control elements update the mobility group data stored at the access elements with the current list of active central control elements.

In addition, a network administrator may take advantage of the configuration functionality according to the present invention by connecting access element 19 to LAN 10a to receive the mobility group IP addresses (or manually configure the access element), and then re-deploy the access element to a desired LAN segment, such as LAN 10c, or simply locate access element 19 in sufficient proximity to other un-configured access elements such that they receive neighbor messages. The network administrator may then deploy additional, un-configured access elements to LAN 10c which discover the central control elements in the mobility/administrative group be receiving neighbor messages from access element 19. Accordingly, a network administrator may use the wireless discovery and configuration functionality described herein to "virally" configure access elements in a wireless network deployment. As one skilled in the art will recognize, as newly deployed access elements become configured and transmit neighbor messages of their own, the deployment and configuration of access elements more distant from the originally configured access element 19 is possible.

The invention has been explained with reference to specific embodiments. Other embodiments will be evident to those of ordinary skill in the art. For example, the access elements in a start-up mode can be configured to behave like wireless clients and associate with a neighboring access element. Once associated with a neighboring access element as a wireless client, it can then request and receive the IP address of a central control element and/or other configuration information. In addition, the present invention can be applied to a wireless network system comprising a plurality of conventional, substantially autonomous access points operating in connection with one or more central management nodes or appliances. In addition, although embodiments of the present invention have been described as operating in 802.11 wireless networks, the present invention can be applied other wireless network environments implementing alternative networking protocols. Furthermore, the present invention has application to other wireless network environments and implementations; for example, the division of functionality between the access elements and the central control elements can be shifted. For example, the access elements can bridge network traffic associated with the remote client elements directly, while transmitting management packets to the central control element. It is, therefore, intended that the claims set forth below not be limited to the embodiments described above.

What is claimed is:

1. In a wireless network system comprising at least one wireless access element for communication with at least one remote client element, wherein the at least one wireless access element is operative to transmit neighbor messages, and at least one central control element for controlling and managing wireless connections between access elements and remote client elements, a method facilitating the initialization and configuration of an access element, comprising
monitoring, at a wireless access element, for wireless neighbor messages from one or more neighboring wireless access elements, the wireless neighbor messages identifying a corresponding computer network address of at least one central control element;
selecting a central control element identified in one or more detected wireless neighbor messages;
transmitting, using a corresponding computer network address, a request to the selected central control element;
associating the wireless access element with the selected central control element to cause the selected central control element to manage wireless connections between the wireless access element and one or more remote client elements;
transmitting wireless management messages sourced from the one or more remote client elements to the selected central control element for processing, wherein the wireless management messages request initiation of wireless connections between the wireless access element and the respective one or more remote client elements; and
tunneling network traffic corresponding to the wireless connections with the remote client elements to the selected central control element.

2. The method of claim 1 further comprising exchanging configuration information with the selected central control element.

3. The method of claim 1 further comprising
transmitting discovery requests over a wired computer network;
monitoring for discovery responses to the discovery requests, each discovery response identifying a central control element.

4. The method of claim 3 wherein the selecting step comprises selecting a central control element identified in a wireless neighbor message or a discovery response.

5. The method of claim 3 wherein the selecting comprises selecting a central control element identified in a wireless neighbor message and a discovery response.

6. The method of claim 2 wherein the information includes the computer network addresses of the central control elements in an administrative group associated with the selected central control element.

7. The method of claim 6 further comprising
after detecting the failure of the selected central control element, selecting a second central control element from the administrative group;
using the computer network address of the selected second central control element to exchange configuration information with the selected second control element.

8. The method of claim 2 wherein the exchanged information allows for operation in an access point mode under the control of the selected central control element.

9. The method of claim 8 further comprising operating in an access point mode under control of the selected central control element.

10. The method of claim 9 further comprising
after detecting the failure of the selected central control element, selecting a second central control element from the administrative group;
using the computer network address of the selected second central control element to exchange information with the selected second control element.

11. In a wireless network system comprising at least one access element for communication with at least one remote client element, and at least one central control element for controlling and managing wireless connections between access elements and remote client elements, a method facilitating the initialization and configuration of an access element, comprising
detecting, at a wireless access element, at least one neighboring wireless access element;
receiving at least one wireless message from the at least one neighboring wireless access element, the at least one message identifying a corresponding computer network address of at least one central control element;

selecting a central control element identified in one or more received wireless neighbor messages;

transmitting, using a corresponding computer network address, a request to the selected central control element over a wired computer network; and operating in an access point mode under control of the selected central control element;

wherein operating in an access point mode comprises transmitting wireless management messages sourced from the one or more remote client elements to the selected central control element for processing, wherein the wireless management messages request initiation of wireless connections between the wireless access element and the respective one or more remote client elements; and tunneling network traffic corresponding to the wireless connections with the remote client elements to the selected central control element.

12. The method of claim 11 wherein the at least one wireless message is a neighbor message.

13. The method of claim 11 further comprising establishing a wireless connection with a detected neighboring wireless access element to receive the at least one wireless message.

14. An apparatus for wireless communication with at least one remote client element and for communication with a central control element, comprising a wireless transmit/receive unit for wireless communication with at least one remote client element;

a network interface for communication with a central control element over a wired computer network;

an access point module controlling the wireless transmit/receive unit and the network interface, wherein the access point module is operative to:

establish and maintain, in conjunction with a managing central control element, wireless connections with remote client elements, receive control data from a central control element; and a configuration module operative to:

monitor for wireless neighbor messages from at least one neighboring wireless access element, the wireless neighbor messages identifying a corresponding computer network address of at least one central control element;

select a central control element;

transmit, using a corresponding computer network address, a request to the selected central control element;

associate with the selected central control element to cause the selected central control element to manage wireless connections between the wireless access element and one or more remote client elements;

transmit wireless management messages sourced from the one or more remote client elements to the selected central control element for processing, wherein the wireless management messages request initiation of wireless connections between the wireless access element and the respective one or more remote client elements; and tunnel network traffic of the wireless connections with the remote client elements to the selected central control element.

15. The apparatus of claim 14 wherein the configuration module is further operative to exchange configuration information with the selected central control element.

16. The apparatus of claim 14 wherein the configuration module is further operative to transmit discovery requests over a wired computer network; and monitor for discovery responses to the discovery requests, each discovery response identifying a central control element.

17. The apparatus of claim 16 wherein the configuration module is operative to select a central control element from the central control elements identified in wireless neighbor messages and discovery responses.

18. The apparatus of claim 14 wherein the access point module is operative to tunnel wireless traffic associated with remote client elements to a central control element.

19. The apparatus of claim 14 wherein the access point module is operative to switch to a neighbor message mode at periodic intervals to transmit neighbor messages, receive neighbor messages from neighboring wireless access devices, and process received neighbor messages.

* * * * *